(12) United States Patent
Baldischweiler

(10) Patent No.: US 12,260,286 B2
(45) Date of Patent: Mar. 25, 2025

(54) METHOD FOR DETERMINING A VALUE OF AN ELECTROMAGNETIC FIELD STRENGTH, METHOD FOR COUPLING A READER, CHIP CARD, AND READER FOR A CHIP CARD

(71) Applicant: GIESECKE+DEVRIENT EPAYMENTS GMBH, Munich (DE)

(72) Inventor: Michael Baldischweiler, Munich (DE)

(73) Assignee: GIESECKE+DEVRIENT EPAYMENTS GMBH, Munich (DE)

( * ) Notice: Subject to any disclaimer, the term of this patent is extended or adjusted under 35 U.S.C. 154(b) by 0 days.

(21) Appl. No.: 18/552,273

(22) PCT Filed: Mar. 23, 2022

(86) PCT No.: PCT/EP2022/025119
§ 371 (c)(1),
(2) Date: Sep. 25, 2023

(87) PCT Pub. No.: WO2022/199895
PCT Pub. Date: Sep. 29, 2022

(65) Prior Publication Data
US 2024/0062024 A1 Feb. 22, 2024

(30) Foreign Application Priority Data
Mar. 25, 2021 (DE) ...................... 10 2021 001 583.5

(51) Int. Cl.
*G06K 7/10* (2006.01)
(52) U.S. Cl.
CPC .............................. *G06K 7/10366* (2013.01)
(58) Field of Classification Search
None
See application file for complete search history.

(56) References Cited

U.S. PATENT DOCUMENTS 5,418,358 A 5/1995 Bruhnke et al.

FOREIGN PATENT DOCUMENTS

DE 102004039650 A1 3/2006
DE 102015004314 A1 10/2016
(Continued)

OTHER PUBLICATIONS

Finkenzeller et al., "RFID Handbook: Grundlagen und Praktische Anwendungeninduktiverfunkanlagen. Transponder und Kontaktloser Chipkarten" ("RFID Handbook: Basics and practical applications of inductive radio systems. Transpond and contactless chip cards"), Sep. 26, 2002, pp. 267-271.
(Continued)

*Primary Examiner* — Kristy A Haupt
(74) *Attorney, Agent, or Firm* — Workman Nydegger

(57) ABSTRACT

A method is for determining a value of an electromagnetic field strength by means of a chip card, having the steps of: providing a chip card having a coil and an integrated circuit; calibrating the chip card by means of different values of an electromagnetic field strength, wherein a power of the integrated circuit is determined in each case for a specific value of the electromagnetic field strength; correlating the different values of the electro-magnetic field strengths with a corresponding power of the integrated circuit in each case; applying an electromagnetic field strength of an unknown value to the chip card; determining a power of the integrated circuit; and determining the value of the electromagnetic field strength corresponding to this power by means of the correlation.

12 Claims, 3 Drawing Sheets

(56) References Cited

FOREIGN PATENT DOCUMENTS

| EP | 0583690 | A2 | 2/1994 |
| EP | 3070636 | B1 | 4/2020 |
| EP | 3278265 | B1 | 8/2020 |

OTHER PUBLICATIONS

German Search Report from corresponding German Patent Application No. DE102021001583.5, Oct. 25, 2021.
International Search Report from corresponding PCT Application No. PCT/EP2022/025119, Jul. 22, 2022.

METHOD FOR DETERMINING A VALUE OF AN ELECTROMAGNETIC FIELD STRENGTH, METHOD FOR COUPLING A READER, CHIP CARD, AND READER FOR A CHIP CARD

BACKGROUND

The invention relates to a method for determining a value of an electromagnetic field strength, a method for coupling a reader and a chip card, a chip card, and a reader for a chip card.

Card-shaped data carriers, in particular chip cards, are used in many settings, for example to carry out cashless payment transactions, as identification documents, or as proof of access authorization. A chip card comprises a card body and an integrated circuit embedded in the card body, for example in the form of a chip module with a chip. The chip module is inserted into a cavity or module opening of the card body.

In the following, chip modules or chip cards with an integrated coil are considered, which enable touchless or contactless communication. For example, chip card controllers with RFID functionality may be used.

Card bodies with a metallic core in the form of a metallic core layer or a metallic core element may also be considered, as well as cards with dual interface (DI) functionality, in which the card body is made partly or entirely of metal. The way such a card works is that a chip module is used, which itself contains a coil (Coil on Module). This coil couples to the metallic card body.

In practice, knowledge of the electromagnetic field strength applied to a chip card may be of interest, for example during the production of the chip card, in the form of a functional test, or when the chip card communicates with or is coupled to a reader.

However, in the case of production machines for chip cards, the electromagnetic field strength cannot be readily determined with the aid of measuring instruments and systems. The measuring systems are designed in such a way that a coil in the form of an ID1 card is held in the corresponding field, and the field strength is calculated from its induced energy. The coil itself is connected to the measuring system via a cable. This cable connection is cumbersome, as there is mechanical movement of the reader or card in the production machines. Moreover, such a measuring system is quite expensive.

Alternatively, a so-called REF-PICC may be used to measure the electromagnetic field strength. This setup is much cheaper compared to a measuring system, but it is also much larger than an ID1 card and must also be connected to a voltmeter using a cable. Thus, this solution is also not suitable for setting field strengths in the production machines.

The two methods mentioned are also not suitable for everyday applications between a chip card and a reader.

SUMMARY

The object of the present invention is therefore to improve the communication between a chip card and the readers.

This object is achieved by a method for determining a value of an electromagnetic field strength, a method for coupling a reader and a chip card, a chip card, and a reader for a chip card.

A method according to the invention for determining a value of an electromagnetic field strength by means of a chip card comprises the steps of Providing a chip card having a coil and an integrated circuit;

Calibrating the chip card by means of different values of an electromagnetic field strength, wherein in each case a power of the integrated circuit is determined at a specific value of the electromagnetic field strength;

Establishing a correlation of the different values of the electromagnetic field strengths with a respective corresponding power of the integrated circuit;

Applying an electromagnetic field strength of unknown value to the chip card; Determining a power of the integrated circuit; and Determining the value of the electromagnetic field strength corresponding to this power by means of the correlation.

A basic idea of the present invention is to use a reference or correlation between the electromagnetic field strength applied to a chip card, in particular the magnetic field strength H, and a power of the chip card. In this way, for example the electromagnetic field strength may be accurately determined. The chip card functions as a measuring instrument, so that no special measuring devices have to be used.

Typical electromagnetic field strengths for communication between a chip card and a reader lie for example in a range between 1.5 A/m and 7.5 A/m. The integrated circuit may for example comprise a processor. The correlation may for example take the form of a table, a matrix, or the like.

The chip module proposed here thus has the advantage that the electromagnetic field strength can be accurately determined in a simple manner using only a chip card. Since the chip card communicates contactlessly, there is no cumbersome cable, meaning that this method can be used for example in moving systems of production machines. The method proposed here may also be used for the calibration of read heads in production machines. In addition, electromagnetic field strengths of unknown systems may be determined, in which for example the position of the read coil in the device is not known.

It may be provided that the correlation of the different values of the electromagnetic field strengths with a respective corresponding power of the integrated circuit is stored in the chip card, and that the corresponding value of the electromagnetic field strength is output from the chip card to the reader. In this way, the chip card can directly output an absolute field strength value. It is also possible for the chip card to output one or more parameters, such as relative changes or information about a power of the integrated circuit. Then, based on the correlation, a value of the electromagnetic field strength can also be determined outside the chip card, for example in the reader.

It may further be provided that the power of the integrated circuit is determined by a processed workload during a defined time interval, a time specification for a processed, defined workload, and/or an achieved operating frequency of the integrated circuit. These are exemplary indications of a measure of the energy absorbed by the integrated circuit or, in other words, of the energy input to the chip card. The operating frequency, and thus the power, of the integrated circuit or of a processor in the integrated circuit is a direct function of the applied electromagnetic field strength at the chip card.

It may be provided that a reader issues a defined Speedtest command to the chip card. The use of a Speedtest command was first described in DE102015004314A1 and has the advantage of having a defined command that is supported by a variety of devices, in particular production machines. The Speedtest command may be determined using the carrier frequency of 13.56 MHz. The Speedtest command may comprise an adjustable waiting time for the response of the chip card. When the waiting time has elapsed, the chip card may output a calculation result, so that the field strength can be inferred from the result and the time interval of the waiting time.

It may further be provided that the chip card outputs the power of the integrated circuit and/or the corresponding value of the electromagnetic field strength in Historical Bytes of the Speedtest command in the ATS. Thus, values can be easily transferred from the chip card without having to initiate new commands.

A method according to the invention for coupling a reader and a chip card having a coil and having an integrated circuit comprises the steps of Emitting an electromagnetic field having an electromagnetic field strength, by means of the reader;

Determining a power of the integrated circuit according to the electromagnetic field strength in the chip card;

Transmitting a parameter value from the chip card to the reader, wherein a magnitude of the parameter value is a function of the determined power; and Providing a signal at the reader for improved relative alignment between the reader and the chip card.

Here as well, a basic idea of the present invention is to use a reference or correlation between the electromagnetic field strength applied to a chip card and a power of the chip card. In this way, for example the relative alignment between the reader and the chip card can be improved for optimized communication or coupling.

If a chip card is used to determine the field strength and/or to determine the best position on or at an unknown device, the method proposed herein may be used for example in software or in an app. This app may have a graphical interface that allows the user to see the applied field strength as a function of the chip card position. If the user then moves the chip card, the data are displayed graphically in an X/Y plane. Alternatively or additionally, a power bar may also be displayed here. The user then has the possibility to determine the best possible position of the card at the reader.

Otherwise, the same advantages and modifications apply as previously described.

It may be provided that at least one indication of a magnitude of the electromagnetic field strength and/or a position for the chip card is provided at the reader. This indication or these indications may for example be displayed visually, such as on a display of a smartphone or other reader. For example, a border of a support area for the chip card may be displayed. Visual or haptic indications or signals are also possible.

It may further be provided that the reader updates the indication in the case of relative movement between the reader and the chip card. In this way, the chip card or the reader can be interactively guided to a position having the best reception. A user can thus be guided directly to this position. Similarly, an automated method is possible in which the reader and the chip card repeatedly communicate with each other to determine the best position.

A chip card according to the invention having a coil and an integrated circuit provides that a correlation of different values of electromagnetic field strengths applied to the chip card with a respective power of the integrated circuit is stored and retrievable in the integrated circuit.

Here as well, a basic idea of the present invention is to use a reference or correlation between the electromagnetic field strength applied to a chip card and a power of the chip card. In this way, for example the electromagnetic field strength can be accurately determined. The chip card functions as a measuring instrument, so that no special measuring devices have to be used. The same advantages and modifications apply as previously described.

It may be provided that the integrated circuit is configured to determine a power of the integrated circuit in response to an electromagnetic field transmitted by a reader to the chip card, to determine the value of the electromagnetic field strength corresponding to this power by means of the correlation, and to output the value to the reader. Thus, an absolute value of the electromagnetic field strength can be determined directly using only the chip card.

It may further be provided that at least two coils are provided which are arranged in different orientations. With this arrangement and/or special geometries of coils, dedicated measurements with respect to the coil position of the reader or a non-uniformity of the reader field may be determined.

A reader for a chip card according to the invention having a coil and having an integrated circuit comprises a transmitting antenna configured to transmit an electromagnetic field having an electromagnetic field strength to a chip card, a receiving antenna configured to receive a parameter value from the chip card, wherein a magnitude of the parameter value is a function of the determined power of the integrated circuit; and a provision device configured to provide a signal at the reader for improved relative alignment between the reader and the chip card.

Here as well, a basic idea of the present invention is to use a reference or correlation between the electromagnetic field strength applied to a chip card and a power of the chip card. In this way, for example the relative alignment between the reader and the chip card can be improved for optimized communication or coupling.

By means of the provision device, the signal or signals may for example be displayed visually, as on a display of a smartphone or other reader. For example, a border of a support area for the chip card may be displayed. Visual or haptic indications or signals are also possible.

One advantage is that different readers may then be set to a uniform reader field, so that respective the chip cards can expect a defined field strength. Otherwise, the same advantages and modifications apply as previously described.

BRIEF DESCRIPTION OF THE DRAWINGS

The present invention is described below by way of example with reference to the accompanying drawings. In the drawings.

DETAILED DESCRIPTION OF VARIOUS EMBODIMENTS

Figure 1:
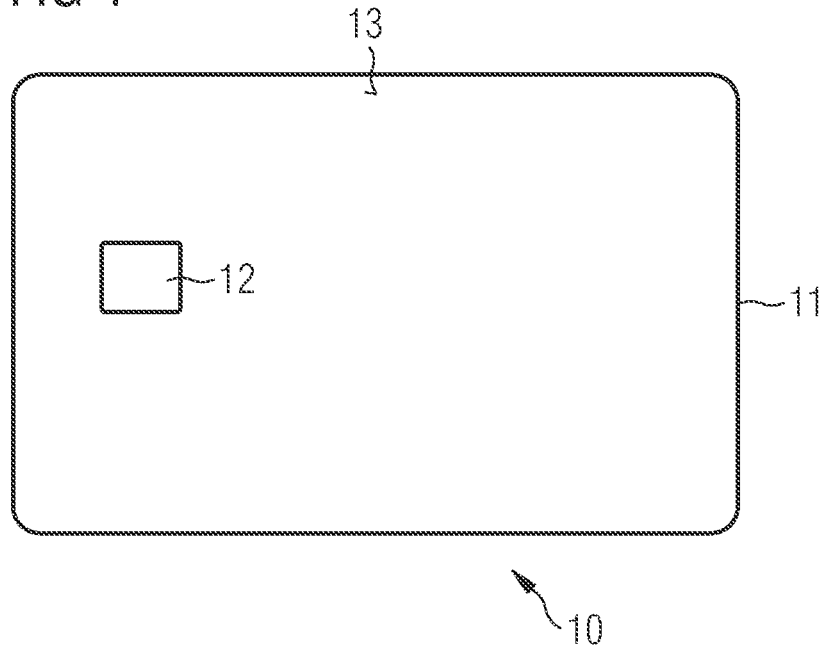
FIG. 1 shows a top view of a chip card.

FIG. 1 shows a chip card 10 having a card body 11. The card body 11 may comprise a metallic layer not shown here, of which the main surfaces may respectively be covered with a plastic layer. A metallic layer may be present, for example made of a core or a layer of a stainless steel alloy, for example having a thickness of 400 μm. The thickness of the card body 11 may for example be between 50 μm and 920 μm.

The chip card 10 further comprises a chip module 12 inserted into a main surface 13 of the card body 11 or chip card 10. The chip module 12 may be inserted into a module opening or cavity. The cavity may comprise a central blind hole and a peripheral rim area. Here, the cavity is covered by the inserted chip module 12. The chip module 12 may be bonded in the cavity.

A slot may be provided in the metallic layer, which extends from a peripheral surface or an outer edge of the card body 11 to the cavity. The slot serves to prevent short-circuit currents or eddy currents.

The chip module 12 may comprise a coil that may be arranged on a module tape not depicted here. The coil may have about 12 to 16 turns which run concentrically around a chip or electronic circuit of the chip module 12. The width of a turn may be 50 μm to 70 μm, and the distance between two turns may be 100 μm. The windings may have copper thicknesses of up to about 30 μm. With such a coil, a maximum of 2.5 pH may be achieved.

The chip may be implemented, for example, in the form of an integrated circuit, and is attached for example in a potting compound to an underside of the chip module 12. The coil supplies the integrated circuit with power and/or signals. This allows an electromagnetic field to be coupled into the coil. For example, the integrated circuit may be or include a chip card controller with RFID functionality.

Figure 2:
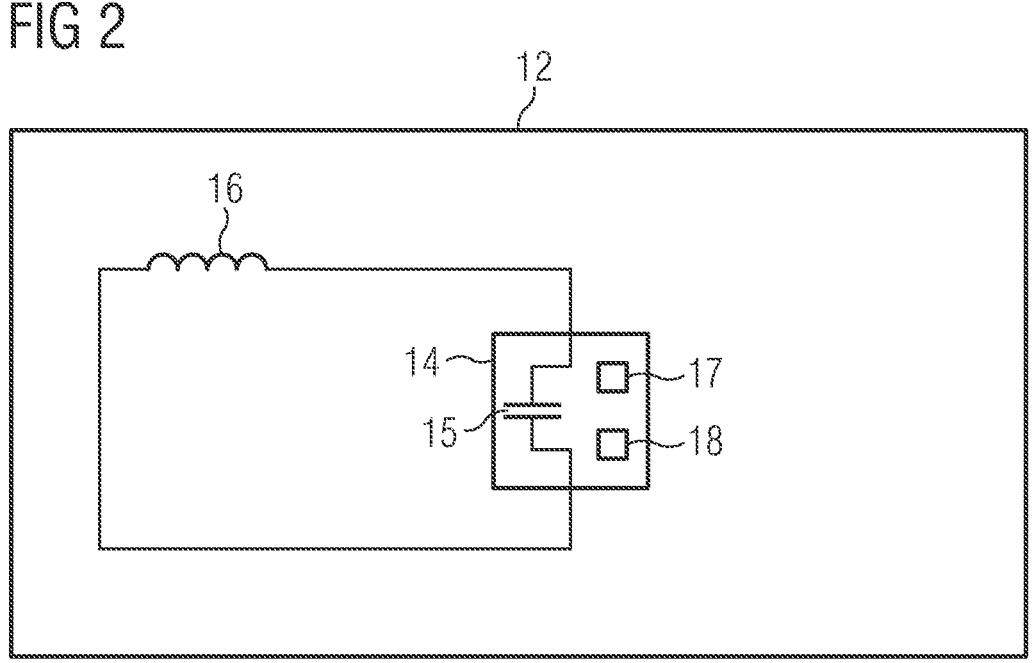
FIG. 2 shows an equivalent circuit diagram of a chip module of the chip card.

FIG. 2 shows an equivalent circuit diagram of the chip module 12 of the chip card 10. The chip module 12 comprises the integrated circuit 14 for example in the form of a chip. The integrated circuit 14 may for example be soldered to the chip module 12 or may have been flipchip mounted to the chip module 12. The integrated circuit 14 includes a card controller for the chip card 10. The integrated circuit 14 typically includes a processor for performing control functions for the chip card 10, and for communication and for performing computational operations, for example for security functions. In addition, the integrated circuit 14 includes a memory area for storing data and/or making data available.

The integrated circuit 14 further includes a capacitor 15 having a capacitance for example of 78 pF. The coil 16 is connected in parallel with the integrated circuit 14.

The coil 16 and the capacitor 15 of the integrated circuit 14 form a resonant circuit. With the aid of this resonant circuit, the chip module 12 can communicate with a reader external to the chip card 10, a production machine, or a measuring device. The reader applies energy to the coil 16 via an electromagnetic field, whereby the integrated circuit 14 is activated and operated.

The integrated circuit 14 has a processor 17 of which the speed is a function of the magnitude of the applied field strength. Above a minimum electromagnetic field strength, the processor 17 and the integrated circuit 14 start operation. As the field strength increases, so does the operating frequency of the processor 17 and the integrated circuit 14, and thus the processing speed. This increase may be linear. Above a cutoff frequency, there is no further increase in the operating frequency. The processor 17 and the integrated circuit 14 are in saturation and operate at maximum frequency.

Thus, a correlation of different values of the electromagnetic field strengths with a respective corresponding power of the integrated circuit 14 or the processor 17 therein may be established.

This correlation may be stored in a memory 18 of the integrated circuit 14.

The chip card 10 may be a D1 card, with high-quality interconnect technology between the integrated circuit 14 and the coil 16. Preferably, it is either a soldered connection or a welded connection.

In addition, this chip card 10 may be equipped with an operating system (OS) that includes or supports a Speedtest command. The Speedtest command is determined at a carrier frequency of 13.56 MHz. The Speedtest command may comprise an adjustable waiting time, for example in a range from 56 ms to 300 ms, for the response of the chip card 10. When the waiting time elapses, the chip card 10 may output a calculation result, so that the electromagnetic field strength can be inferred from the result, i.e. a performed work or power of the integrated circuit 14, and the time interval of the waiting time.

The Speedtest command may be implemented in such a way that the result is output in the Historical Bytes of the ATS. Alternatively, the Speedtest command may also be used via an additional command that the OS supports.

Figure 3:
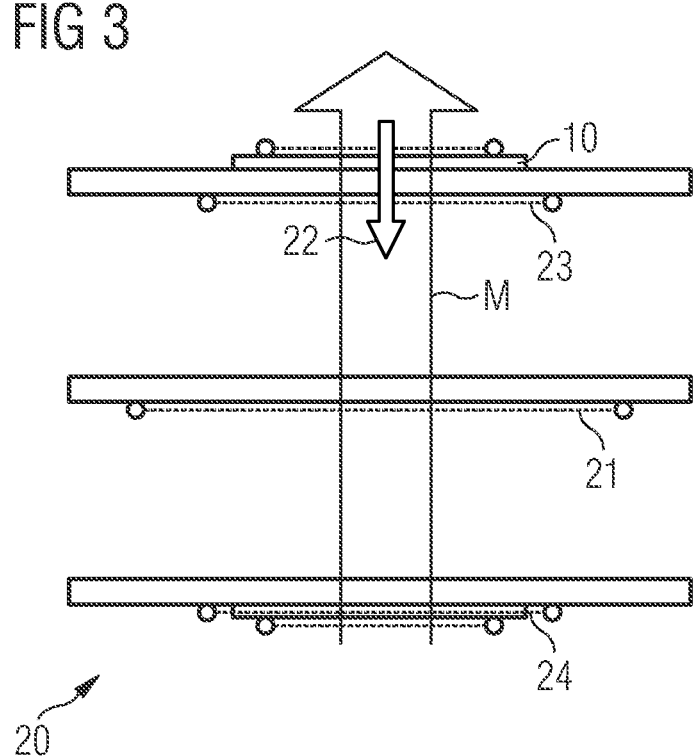
FIG. 3 shows schematic depiction of a calibration device for a chip card.

FIG. 3 shows a schematic depiction of a calibration device 20 for a chip card 10.

Via a coil 21, the electromagnetic field strength, in this case the magnetic field strength H, is first traversed or set in a range from 0 A/m to 7.5 A/m.

Above a certain field strength, the chip card 10 starts to transmit information, for example an ATS. The chip card 10 also returns the determined result in the Historical Bytes, in the form of a parameter value 22 from the Speedtest. This parameter value 22 may comprise for example the processor speed, a time unit, and/or processed commands.

These parameter values 22 are received by an upper receiving coil 23 and a lower receiving coil 24 and then evaluated and stored. In this way, a correlation of the different values of the electromagnetic field strengths with a respective corresponding power of the integrated circuit 14 may be established.

For each of the emitted field strengths, a parameter value 22 for the corresponding power of the integrated circuit 14 is recorded, for example using the Speedtest command. Since the respective field strengths emitted are known, a correlation of the different values of the electromagnetic field strengths with a respective corresponding power of the integrated circuit 14 can thus be established.

When this correlation or relationship is established in the calibration device 20, it may be imported into the chip card 10, for example via a command. Thus, the chip card 10 can then directly output the field strength. Alternatively, an additional external program may perform the conversion to the field strength. The correlation may also be established in the chip card 10; the Speedtest command or another command then contains an indication of the value of the respective emitted field strength.

After these measurement data have been determined, the chip cards 10 may be used directly in the production machines. The chip card 10 then directly returns the usable field strength to the production reader during the ATS.

Figure 4:
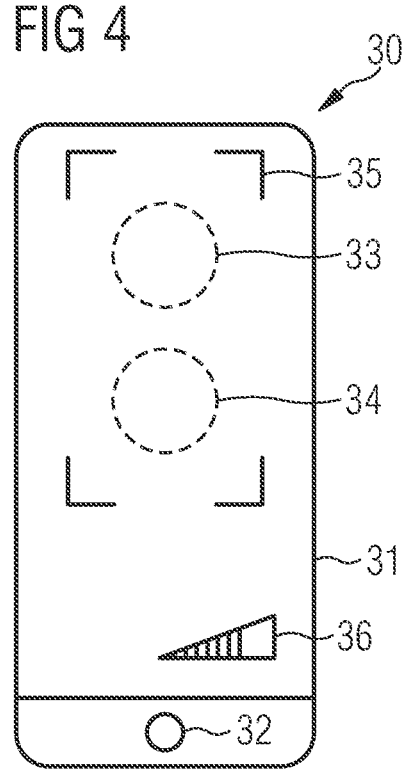
FIG. 4 shows a schematic depiction of a reader for a chip card.

FIG. 4 shows a schematic depiction of a reader 30 for a chip card 10. Here, a reader 30 in the form of a smartphone is shown as an example. Other readers such as fixed readers or readers without their own display may also be used.

The reader 30 includes a display 31 and a control element 32, for example in the form of a button or element on a touch screen.

The reader 30 has a transmitting antenna 33 arranged to transmit an electromagnetic field having an electromagnetic field strength to a chip card 10. The transmitting antenna 33 may be implemented for example by a coil of which the central axis is perpendicular to a surface of the display 31. The operating element 32 may be used to start the method or the transmission of an electromagnetic field having an electromagnetic field strength to a chip card 10.

The reader 30 further has a receiving antenna 34 configured to receive a parameter value from the chip card 10, wherein a magnitude of the parameter value is a function of the determined power of the integrated circuit 14. The receiving antenna 34 may be implemented for example by a coil of which the central axis is perpendicular to a surface of the display 31. The transmitting antenna 33 and the receiving antenna 34 may be combined.

The reader 30 comprises a provision device, here in the form of the display 31, configured to provide at least one signal at the reader 30 for improved relative alignment between the reader 30 and the chip card 10.

For example, the signal may be depicted as or comprise a border 35 of a support area for the chip card 10. The border 35 is depicted on the display 31 at the position where the highest or strongest power of the integrated circuit 14 was determined according to the electromagnetic field strength in the chip card 10.

Alternatively or additionally, a power bar 36 may be shown in the display 31. The user then has the possibility with the chip card 10 to determine the best possible position at the reader 30.

Figure 5:
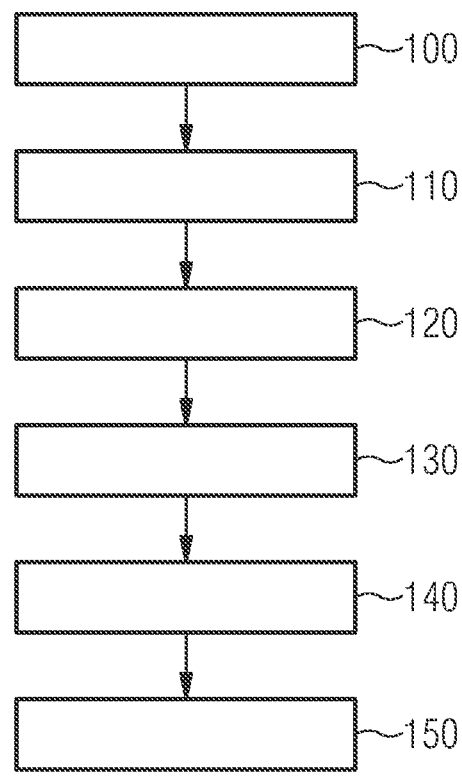
FIG. 5 shows a flowchart of a method for determining a value of an electromagnetic field strength by means of a chip card.

FIG. 5 shows a flowchart of a method for determining a value of an electromagnetic field strength by means of a chip card 10.

In a first step 100, a chip card 10 having a coil 16 and an integrated circuit 14 is provided, as previously described.

In a second step 110, the chip card 10 is calibrated by means of different values of an electromagnetic field strength, wherein in each case, a power of the integrated circuit 14 is determined at a particular value of the electromagnetic field strength. A calibration device 20 for a chip card 10 as shown in FIG. 3 may be used for this purpose.

In a third step 120, a correlation of the different values of the electromagnetic field strengths with a respective corresponding power of the integrated circuit 14 is established.

For each of the emitted field strengths, a parameter value 22 for the corresponding power of the integrated circuit 14 is recorded, for example using the Speedtest command. Since the respective field strengths emitted are known, a correlation of the different values of the electromagnetic field strengths with a respective corresponding power of the integrated circuit 14 can thus be established.

While the first three steps 100 to 120 were, in a sense, preparatory steps for the chip card 10, the following steps are for the actual determination of a value of an electromagnetic field strength by means of the chip card 10.

In a fourth step 130, an electromagnetic field strength of unknown value is applied to the chip card 10. This electromagnetic field strength is output by a reader such as a production machine, smartphone, RFID transponder, or the like. In contrast to the first three steps 100 to 120, which take place in a defined test or calibration environment, the further steps take place in an everyday, undefined environment. Therefore, the electromagnetic field strengths are of unknown value.

In a fifth step 140, a power of the integrated circuit is determined. This takes place analogously to the second step 110 of calibration. A defined test or defined command is processed in the integrated circuit 14, and a power of the integrated circuit 14 is determined by a processed workload during a defined time interval, a time specification for a processed, defined workload, and/or an achieved operating frequency of the integrated circuit 14.

In a sixth step 150, the value of the electromagnetic field strength corresponding to this power is determined by means of the correlation. This can be done by simply retrieving the field strength value specified for the determined power from the correlation. The correlation may be a table, a matrix or the like.

This determination may take place in the reader 30 and/or in the chip card 10. Communication between the two units uses wireless near-field communication, so that data is transmitted quickly and securely between the reader 30 and the chip card 10. As previously described, a Speedtest command may be used for communication.

Thus, the correlation of the different values of the electromagnetic field strengths with a respective corresponding power of the integrated circuit 14 may be stored in the chip card 10, and the corresponding value of the electromagnetic field strength may be output from the chip card 10 to the reader 30.

Thus, the absolute value of the electromagnetic field strength can be determined without the aid of a special measuring device, using only the calibrated chip card 10.

Figure 6:
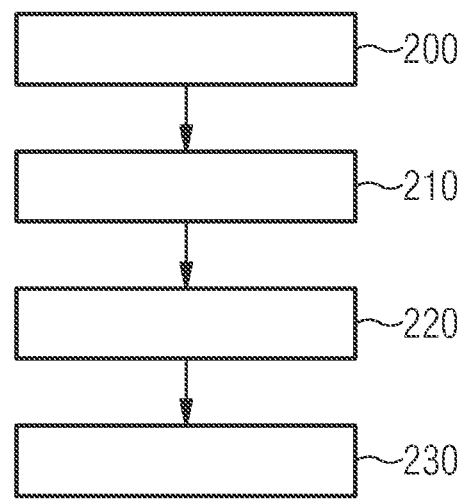
FIG. 6 shows a flowchart of a method for coupling a reader and a chip card.

FIG. 6 shows a flowchart of a method for coupling a reader 30 and a chip card 10.

In a first step 200, the reader 30 emits an electromagnetic field having an electromagnetic field strength. This electromagnetic field strength is output by a reader such as a production machine, smartphone, RFID transponder, or the like, in an everyday, undefined environment. Therefore, the value of the electromagnetic field strength is unknown.

In a second step 210, a power of the integrated circuit 14 according to the electromagnetic field strength in the chip card 10 is determined. A defined test or a defined command is processed in the integrated circuit 14, and a power of the integrated circuit 14 is determined by a processed workload during a defined time interval, a specification for a processed defined workload, and/or an achieved operating frequency of the integrated circuit 14.

In a third step 220, a parameter value is transmitted from the chip card 10 to the reader 30, wherein a magnitude of the parameter value is a function of the determined power. Communication between the two units takes place in contactless near-field communication.

In a fourth step 230, a signal is provided at the reader 30 for improved relative alignment between the reader 30 and the chip card 10.

For example, the signal may be depicted as or comprise a border 35 of a support area for the chip card 10. The border 35 is depicted on the display 31 at the position where the highest or strongest power of the integrated circuit 14 was determined according to the electromagnetic field strength in the chip card 10.

Alternatively or additionally, a power bar 36 may be shown in the display 31. The user then has the possibility with the chip card 10 to determine the best possible position at the reader 30.

Using these methods, the chip card 10, and the reader 30 described here, it is possible to set the field strength of production machines and readers for any type of RFID system (e.g. wristbands, ID cards, stickers, etc. . . . ). Another advantage consists in setting the readers to a uniform reader field, so that the chip cards can each expect a defined field strength. This allows significantly improved transmission between the chip cards and the reader.

In addition, it is possible to determine the maximum field strength on or at a reader without the user knowing where the coil is located in the reader. This is possible because the chip card 10 is a measuring device for the electromagnetic field strength emitted by the reader.

Determining the maximum field strength in this way allows the position of the chip card relative to the reader to be optimized, so that maximum energy transmission can be ensured.

The invention claimed is:

1. A method for determining a value of an electromagnetic field strength by means of a chip card, comprising the steps of:
    providing a chip card having a coil and an integrated circuit;
    calibrating the chip card by means of different values of an electromagnetic field strength,
    wherein in each case a power of the integrated circuit is determined at a specific value of the electromagnetic field strength;
    establishing a correlation of the different values of the electromagnetic field strengths with a respective corresponding power of the integrated circuit;
    applying an electromagnetic field strength of unknown value to the chip card;
    determining a power of the integrated circuit; and
    determining the value of the electromagnetic field strength corresponding to this power by means of the correlation.

2. The method according to claim 1, wherein the correlation of the different values of the electromagnetic field strengths with a respective corresponding power of the integrated circuit is stored in the chip card, and in that the corresponding value of the electromagnetic field strength is output from the chip card to the reader.

3. The method according to claim 1, wherein the power of the integrated circuit is determined by a processed workload during a defined time interval, a time specification for a processed, defined workload, and/or an achieved operating frequency of the integrated circuit.

4. The method according to claim 1, wherein a reader issues a defined Speedtest command to the chip card.

5. The method according to claim 4, wherein the chip card outputs the power of the integrated circuit and/or the corresponding value of the electromagnetic field strength in Historical Bytes of the Speedtest command.

6. A method for coupling a reader and a chip card having a coil and having an integrated circuit, comprising the steps of:
    emitting an electromagnetic field having an electromagnetic field strength, by means of the reader;
    determining a power of the integrated circuit according to the electromagnetic field strength in the chip card;
    transmitting a parameter value from the chip card to the reader, wherein a magnitude of the parameter value is a function of the determined power; and
    providing a signal at the reader for improved relative alignment between the reader and the chip card.

7. The method according to claim 6, wherein at least one indication of a magnitude of the electromagnetic field strength and/or a position for the chip card is provided at the reader.

8. The method according to claim 7, wherein the reader updates the indication in the case of relative movement between the reader and the chip card.

9. A chip card having a coil and an integrated circuit, wherein a correlation of different values of electromagnetic field strengths applied to the chip card with a respective power of the integrated circuit is stored and retrievable in the integrated circuit.

10. The chip card according to claim 9, wherein the integrated circuit is configured to determine a power of the integrated circuit in response to an electromagnetic field transmitted by a reader to the chip card, to determine the value of the electromagnetic field strength corresponding to this power by means of the correlation, and to output the value to the reader.

11. The chip card according to claim 9, wherein at least two coils are provided which are arranged in different orientations.

12. A reader for a chip card having a coil and having an integrated circuit, comprising a transmitting antenna configured to transmit an electromagnetic field having an electromagnetic field strength to the chip card, a receiving antenna configured to receive a parameter value from the chip card,
    wherein a magnitude of the parameter value is a function the determined power of the integrated circuit, and a provision means configured to provide a signal at the reader for improved relative alignment between the reader and the chip card.

* * * * *